United States Patent [19]
Field

[11] Patent Number: 5,775,542
[45] Date of Patent: Jul. 7, 1998

[54] SELF CONTAINED DRUM DUMPING AND HOT MELT HOLDING TANK AND METHOD OF UNLOADING, MELTING AND DISPENSING A SLUG OF HOT MELT MATERIAL

[75] Inventor: Arnold Field, Garfield, N.J.

[73] Assignee: Watson Machinery Internationl, Paterson, N.J.

[21] Appl. No.: 482,637

[22] Filed: Jun. 7, 1995

[51] Int. Cl.⁶ .................................................. F27B 14/00
[52] U.S. Cl. ................................ 222/146.5; 222/146.2; 222/1; 414/419; 219/214; 219/389; 219/535; 141/82
[58] Field of Search .................. 141/67, 82, 319–322, 141/364; 414/419, 420, 422, 621, 622; 222/146.2, 146.5, 1; 219/214, 385, 389, 521, 535; 392/444, 459

[56] References Cited

U.S. PATENT DOCUMENTS

| | | | |
|---|---|---|---|
| 2,358,624 | 9/1944 | Burry | 18/30 |
| 4,018,468 | 4/1977 | Lundquist | 294/67 |
| 4,024,854 | 5/1977 | Park et al. | 126/343.5 |
| 4,074,707 | 2/1978 | Perelman | 126/343.5 |
| 4,308,447 | 12/1981 | Ntzold et al. | 219/421 |
| 4,505,669 | 3/1985 | Rogers | 423/13 |
| 4,717,809 | 1/1988 | Schwizer | 219/438 |
| 4,724,983 | 2/1988 | Claassen | 222/146.5 |
| 4,790,455 | 12/1988 | Dieringer et al. | 222/146.2 |
| 4,919,308 | 4/1990 | Majkrzak | 222/146.5 |

*Primary Examiner*—J. Casimer Jacyna
*Attorney, Agent, or Firm*—Weingram & Associates, P.C.

[57] ABSTRACT

A method and device for quickly, easily, efficiently and safely dispensing hot melt from a container includes a dumper for receiving a container of hot melt. The dumper has removable smooth inner sheeting for receiving and holding canisters of different materials. The dumper has a heater heated by overlapping conducting coils for heating the hot melt in the container. The dumper receives the hot melt container at floor level and thereafter is actuated to move the dumper over and about a hopper to invert the container above the hopper. Additionally, the dumper forms a hermetic seal about the container and the hopper for firmly holding the container within the dumper to allow the hopper and the bottom of the container to be subjected to a controlled atmosphere. In operation, the bottom of the container may be punctured and an inert gas inserted within the dumper, and into the container under a relatively low pressure to force the hot melt slug from the container upon minimal heating of the sides of the container. After the slug of hot melt material is removed from the container and in the hopper of the processing machine, the dumper is returned to its level at the floor and the empty container safely removed.

15 Claims, 15 Drawing Sheets

SELF CONTAINED DRUM DUMPING AND HOT MELT HOLDING TANK AND METHOD OF UNLOADING, MELTING AND DISPENSING A SLUG OF HOT MELT MATERIAL

BACKGROUND OF THE INVENTION

1. Field of the Invention

The present invention relates to the field of cable manufacturing and more specifically relates to a method and apparatus for emptying petroleum based compounds from the drums in which such compounds are stored, and the subsequent use of such compounds in cable filling machines. Even more specifically, the present invention relates to a device for receiving drums of hot melt materials and emptying the materials from the drums by liquefying and dispensing the hot melt.

2. Description of the Prior Art

Meltable materials, hereinafter referred to as "hot melts", are used in industry for adhesive and coating purposes. Hot melts typically include polymers, and resin as well as other materials as is known in the art and are available in the form of powders, granules and slugs. The slugs are typically shipped and stored in relatively large drums (55 gallon drum).

These hot melts are used by liquefying the hot melt and by pumping the liquid to an application head for applying the hot melt as desired.

When small pieces of hot melt are used, the pieces can be fed directly into a hopper which melts the pieces to form the liquified hot melt. However, when a high volume of the hot melt material is needed, it is desirable to use the larger slugs of hot melt material. In order to use the hot melt slugs, a dispensing apparatus must be employed to remove the slugs from the container. One type of apparatus for unloading drums of hot melt material is an immersed pump (powered by air or electricity) which liquifies and dispenses the solid, unitary mass, hot melt slug directly from a container.

Drum unloaders generally include a melting grid for melting the hot melt from the container, a dispensing apparatus and a pumping apparatus for pumping the liquified hot melt to the application head. The melting grid is forced by a hydraulic platen into the drum containing the hot melt material. Accordingly, the hot melt is liquified by the melting grid and forced out of the drum by the pressure of the platen. These drum unloaders however can create difficulties in operation. Because of the force of the platen, the drums can rupture the drum containers causing the melt to be spewed. Also, such drum unloaders leave some of the hot melt material within the drum. Also, the hot melt grid can be buried within the drum container causing a removal problem.

Some apparatus and system in the prior art have been developed to counteract these problems, although none of the devices in the prior art teach all of the structure and advantages of Applicant's invention. Some of the systems in the prior art include U.S. Pat. No. 4,505,669 to Rogers which discloses a hopper-type melter which loads the entire hot melt drum, including the container, into the hopper. Heating elements projecting upwardly from the bottom of a hopper extend into the open lower end of the drum container to contact the hot melt material. The projections melt the hot melt to cause it to flow through the bottom of the melter where additional heating elements fully liquify the hot melt material to be pumped to the application head. However, this system has several draw backs. The hot melt may be melted out of the drum faster than it is used, and the backup this created can congeal around the container and cause problems with respect to handling the empty container.

U.S. Pat. No. 4,724,983 to Classen discloses a hot melt dispenser having a hopper sized to receive a container, a melting means, a support means for supporting a container in the hopper and a means for pumping liquified hot melt from the hopper and auxiliary heating means located around the circumference of the hopper.

U.S. Pat. No. 4,919,308 to Malkrzak discloses a hot melt dispenser for use in melting a slug of hot melt from a container and for dispensing the hot melt slugs from a drum. The dispenser includes a hopper sized to receive the container of hot melt and support means for supporting the container within the hopper. After the container is placed within the hopper, the cover is closed to seal the container within the hopper. Band heaters are positioned around the circumference of the hopper to heat the walls of the container suspended in the hopper to cause the hot melt slug within the container to be released as a slug into the hopper. The patent also discloses a method requiring supporting a container of hot melt slug in a hopper, venting the upper end of the container by removing it or punching holes in it, and heating the container by uniformly encircling the walls of the container with heat to release the slug from the container. The container is then removed from the hopper leaving the slug therein. The container is positioned in and removed from the hopper by means of a fork lift.

Miltex Corporation of Peachtree City, Ga. uses a bulk hopper-type melter which can accommodate a 55 gallon drum of hot melt and includes an unloading device which tips up and lifts a drum over the melter for unloading. Thereafter, the outside of the drum is radiated with infrared heaters mounted over the melter until the hot melt slug inside the drum releases from the container into the hopper. The device includes a heated spike positioned across the diameter of the open end of the drum for restraining movement of the slug.

U.S. Pat. No. 2,358,624 to Burry discloses means for heating thermal plastic materials for molding.

U.S. Pat. No. 4,018,468 to Lundquist shows a lifting ring for drum containers.

U.S. Pat. No. 4,024,854 to Park, et al. discloses a drum unloading apparatus and a method for unloading the drum. The apparatus includes means for extracting the hot melt from the drum.

U.S. Pat. No. 4,074,707 to Perelman discloses a melting grid for melting a solid polymer.

U.S. Pat. No. 4,308,447 to Notzold discloses apparatus for liquefying meltable material which includes a container to be filled with material to be liquified.

U.S. Pat. No. 4,505,669 to Rogers discloses a liquefying hot melt adhesive hopper using heated cones.

U.S. Pat. No. 4,717,809 to Schwizer discloses the use of band heaters on the outside of the hopper.

OBJECTS AND SUMMARY OF THE INVENTION

None of these prior efforts teach or suggest the principal object and advantage of the system employed in the present invention which quickly, easily, efficiently and safely empties a hot melt slug from a container.

It is a further object and advantage of this invention to provide a seal between the inverted drum container and the hopper so that a controlled atmosphere can be injected into the hopper.

Another object and advantage of the invention is the provision of a probe for puncturing the bottom of the drum to inject the space between the bottom of the drum and the hot melt with the controlled atmosphere.

Another object and advantage of the invention is the provision of a drum holding assembly supporting the drum between two halves of a cylinder.

Another object and advantage of the invention is the provision of removable smooth heated surfaces for contacting the drum in the cylinder.

Another object and advantage of the invention is the provision of electrical heating elements between the walls of the halves of the cylinder and the removable smooth surfaces for heating said surfaces and thereby the contents of the drum to enable the holding assembly to be used with either fibre drums with the smooth surfaces in places or with metal drums when the smooth surfaces are removed.

A further object and advantage of the invention is the provision of fibre drum heating surfaces in the drum support.

Another object and advantage of the invention is the provision of a hopper having a sump for collecting the liquefied melt having the pump mounted in the sump so that the pump is maintained at the same temperature as the liquified melt.

Another object and advantage of the invention is the provision of a pump which is heated by a liquid melt bath.

Another object and advantage of the invention is the provision of a piercing tool for injecting pressurized gas between the bottom of the inverted drum and the contents of the drum.

Another object and advantage of the invention is the provision of a device of the class described where a controlled atmosphere of special gasses can be injected to treat the contents of the inverted drum as the drum contents are heated in the drum and in the hopper.

Still another object and advantage of the invention is the provision of a seal between the hopper and the inverted drum so that an inert gas, dry air, or other atmosphere can be supplied to the material without contamination of the required atmosphere or leakage to the outside.

A further object of the present invention to provide a hot melt dispenser for dispensing all the hot melt from a container.

It is another object of this invention to provide a dumper for loading a container of hot melt therein at a convenient position without need of cranes, hoists or fork lifts.

It is an additional object of the present invention to provide means for inverting the dumper 180 degrees to position a container of hot melt over a hopper.

It is an additional object of this invention to provide a dumper which receives and holds a hot melt canister even when the canister is moved to an inverted position.

It is an additional object of the present invention to provide heaters within the dumper in the periphery of the dumper for heating the container of hot melt to melt the hot melt material.

It is an additional object of this invention to provide a hot melt dispenser having a dumper which is heated by overlapping conducting coils.

It is another object and advantage of the invention to provide a dumper that forms a hermetic seal around the hopper for allowing the hopper to be treated with a controlled atmosphere.

It is a further object and advantage of the present invention to provide a hermetic seal around the container in the dumper to prevent leakage and contamination of a controlled atmosphere injected into the hopper and/or the container.

It is a further object of the present invention to pump pressurized gasses into the container to aid in forcing the hot melt slug out of the container.

It is another object of this invention to use an inert gas for pressuring the slug.

These objects and advantages of the present invention are achieved by a system and apparatus comprising various parts which work together effectively to produce a method and device for quickly, easily, efficiently and safely dispensing hot melt from a container into a hopper for distribution to a delivery system.

The device of the present invention includes a hopper for melting slugs of hot melt material, and a dumper for receiving a container of hot melt and delivering its contents to the hopper. The dumper has removable smooth inner sheeting for receiving and holding canisters of different materials. The dumper has a heater heated by overlapping conducting coils for heating the hot melt in the container. The dumper receives the hot melt container at floor level and thereafter is actuated to move the dumper over and about a hopper to invert the container above the hopper. Additionally, the dumper forms a hermetic seal about the hopper to allow the hopper to be subjected to a controlled atmosphere. The bottom of the canister may be punctured and an inert gas inserted within the container under a relatively low pressure to force the hot melt slug from the container upon minimal heating of the sides of the container. After the slug of hot melt material is removed from the container and in the hopper of the processing machine, the dumper is returned to its level at the floor and the empty container safely removed therefrom.

The apparatus of the present invention employs four sets of heaters. The first set of heaters are employed on the dumper as part of the container transporter. The second set of heaters are located inside the hopper so that when the slug moves from the drum into the hopper, the slug is heated. The third set of heaters is the grid on which the slug rests. The fourth set controls the sump temperature.

The present invention also provides a removable inner heat conducting surface for the dumper drum canister heating system. The heat conducting surface is formed of an aluminum sheet which is removably connected in both halves of an openable drum supporting cylinder. This sheet is used with fibre drums and is removed for steel drums. Electrical heaters are mounted between the walls of the supporting cylinder and the sheet. When the sheet is removed, the steel drum itself can act as the heat sink and heat distributor from the electrical heaters. With the sheet in place, heat is dissipated evenly over the walls of fibre drums. The heat conducting surface provided is non-abrasive, non-intrusive, and distributes heat uniformly so that both fibre composition drums or steel drums can be heated and utilized in the invention.

The present invention also includes a hermetic seal between the hopper and the dumper to prevent ambient air which may contain contaminants or moisture from entering into the hopper and/or to prevent contamination or oxygenation of any required artificial environment produced in the hopper for specialized melt products.

The hermetic seal of the present invention includes a seal between the mouth of the hopper and the top of the container. The seal provides an airtight seal when the dumper contacts the top of the hopper. After contact between the top of the dumper and the seal at the mouth of the hopper, a controlled atmosphere of special gas may be injected into the hopper while the contents of the drum is melting.

If required, a positive pressure can also be developed in the container in coaction with the controlled atmospheric supply manifold to pressurize and/or supply controlled atmosphere to the container between its bottom and the slug to aid in forcing the heated slug from the container into the hopper while it is being subjected to the controlled atmosphere.

BRIEF DESCRIPTION OF THE DRAWINGS

Other important objects and features of the invention will be apparent from the following detailed description of the invention taken in connection with the accompanying drawings in which.

DETAILED DESCRIPTION OF THE INVENTION

Figure 1:
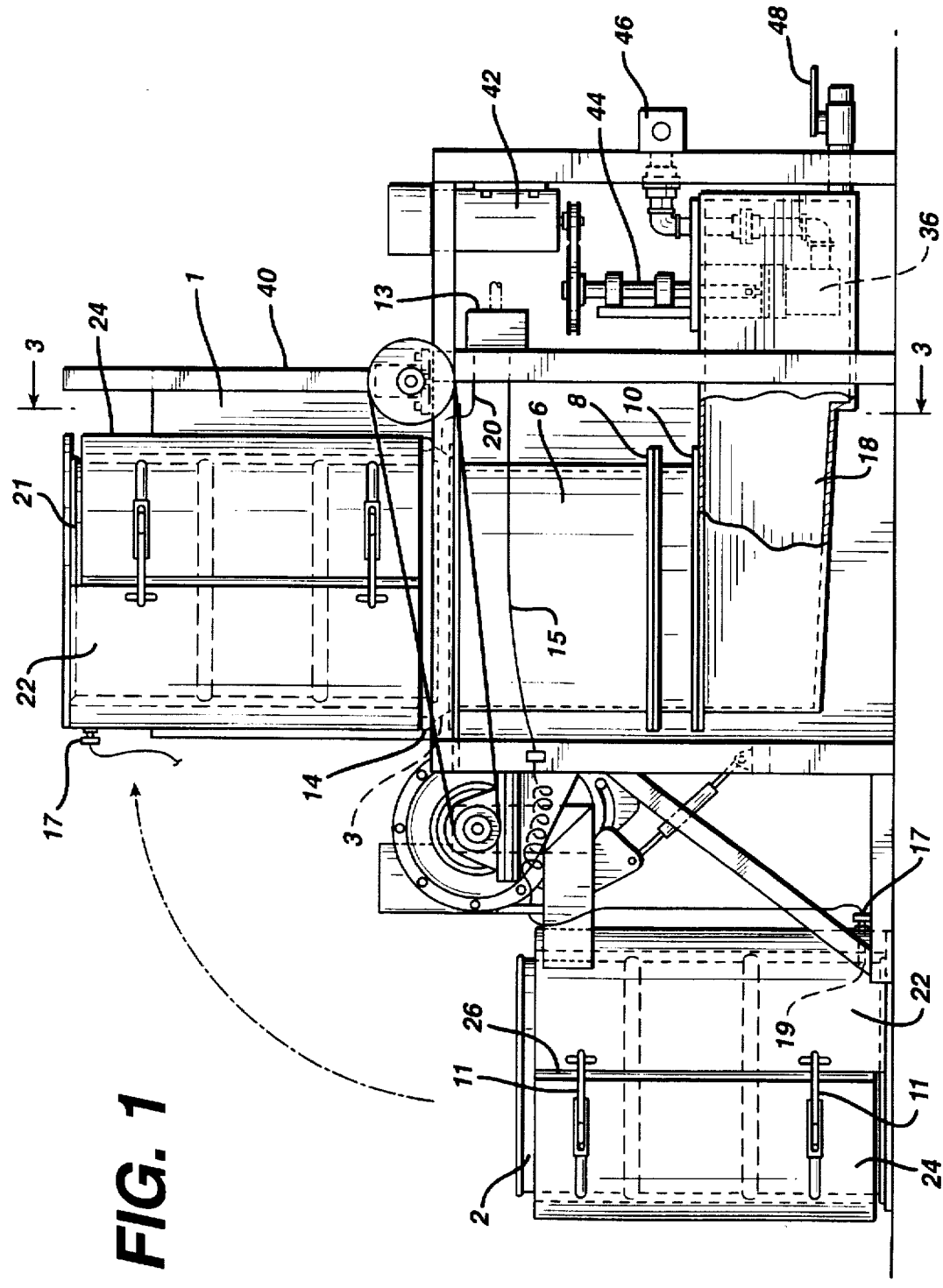
FIG. 1 is a front view of the invention.

FIG. 1 is a front view of the apparatus of my invention. As shown therein, a support frame is provided for hopper 6. The hopper 6 has two stages of heaters, 8 and 10 formed therein for producing a hot melt to a sump chamber 18. The hot melt is used for further processing in a manner well known in the prior art. The present invention automatically lifts a 55 gallon drum 2 or other suitable container of material from a position shown at the left of FIG. 1 and dumps the container by inverting same to the position shown at 2' in FIG. 1. The container 2 at the position initially shown in FIG. 1, may be moved by an automatic lifting apparatus. The container may be heated by heat conducting surfaces which are non-abrasive, non-intrusive to distribute heat uniformly over the exterior of the container 2.

The apparatus for uniformly distributing the heat is shown in more detail in FIGS. 2 and 7–11. A container drum 2 is clamped into a drum lifting mechanism utilizing clamps which are manually tightened and are shown generally at 11 in FIG. 1. The clamps close two halves of a drum supporting cylinder. The halves are denoted as 22 and 24 in FIG. 2. These halves are hinged at 30 and are openable about hinge 30 in the manner of a "clam shell". Each of the halves 22 and 24 have electrical heating coils 32 connected to the outer walls of each half of the drum supporting cylinder. These heaters may be covered by smooth, uniform aluminum sheet segments 34 and 34a. The sheet segments 34 and 34a are used to heat fibre drums. The sheet is removed when steel drums are used and the electrical heaters are directly exposed to the steel drum surface.

Figure 7:
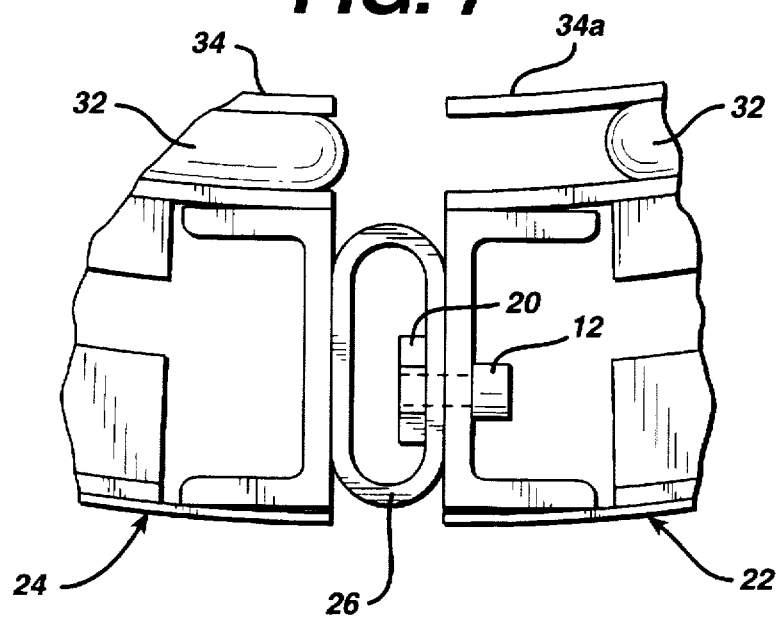
FIG. 7 is a top view of a portion of FIG. 1.
Figure 8:
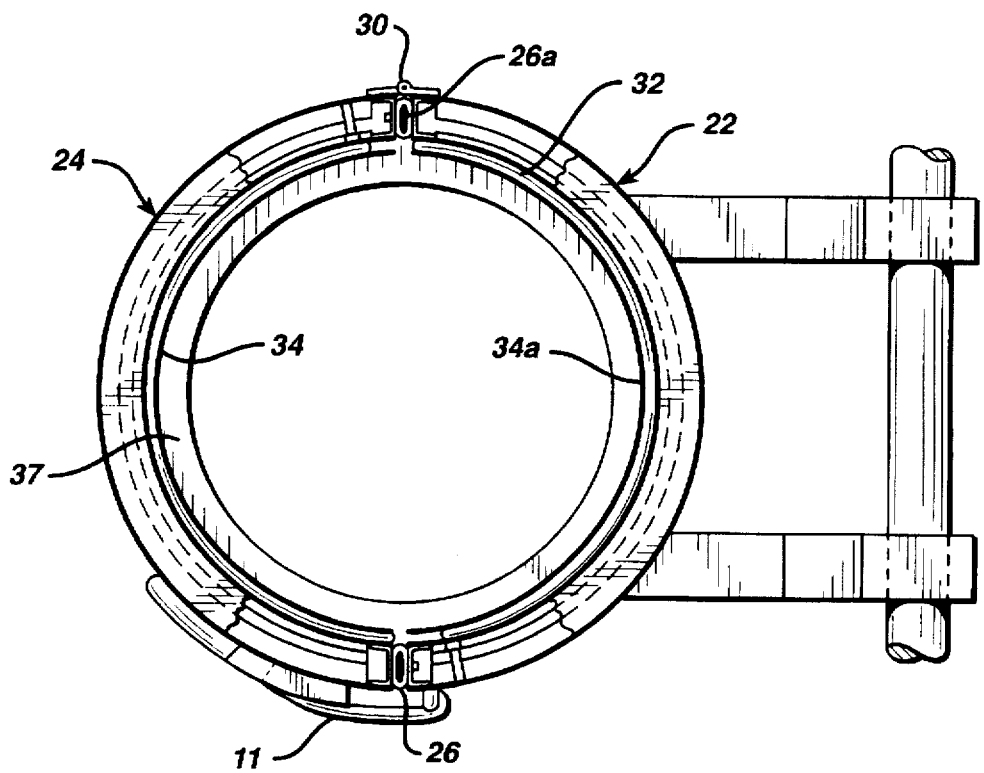
FIG. 8 is a top view of a portion of FIG. 1.
Figure 9:
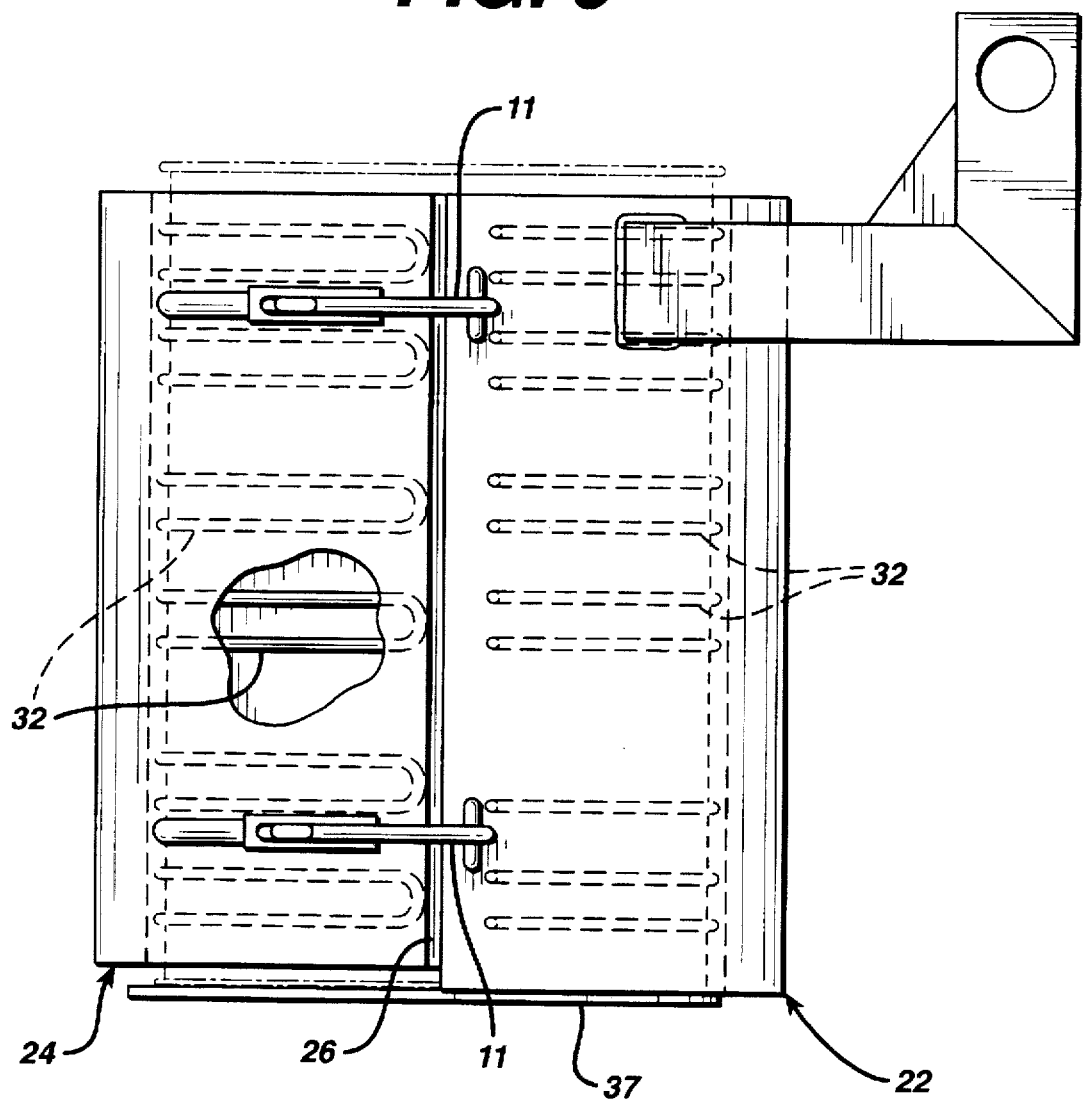
FIG. 9 is a front view, partially in section of the device shown in FIG. 8.

In FIGS. 7–8, the two halves 22 and 24 are separated when closed by an insulating flexible seal 26 affixed to one half 22 of the drum supporting cylinder with nut 20 and bolt 12. FIG. 8 shows the two halves 22 and 24 connected by hinge 30. The hinged connection 30 employs another flexible seal 26a between the halves 22 and 24. Seal 26a is connected to halves 22 and 24 in the same manner as described in FIG. 7 for seal 26.

These seals, 26 and 26a form a hermetic seal to prevent leakage of or contamination to the special gasses which may be injected in hopper 6 and in the bottom of the hot melt container.

FIG. 8 also shows a circular bottom plate 37 which is affixed to the support half 22. The bottom plate provides additional support for the container in the dumper and prevent the container from dropping out of the dumper when the container is lifted and inverted to the position 2' in FIG. 1. The bottom plate 37 also functions as part of the hermetic sealing of the hopper and the inverted container so that the hopper and container can be subjected to a controlled atmosphere.

Figure 2:
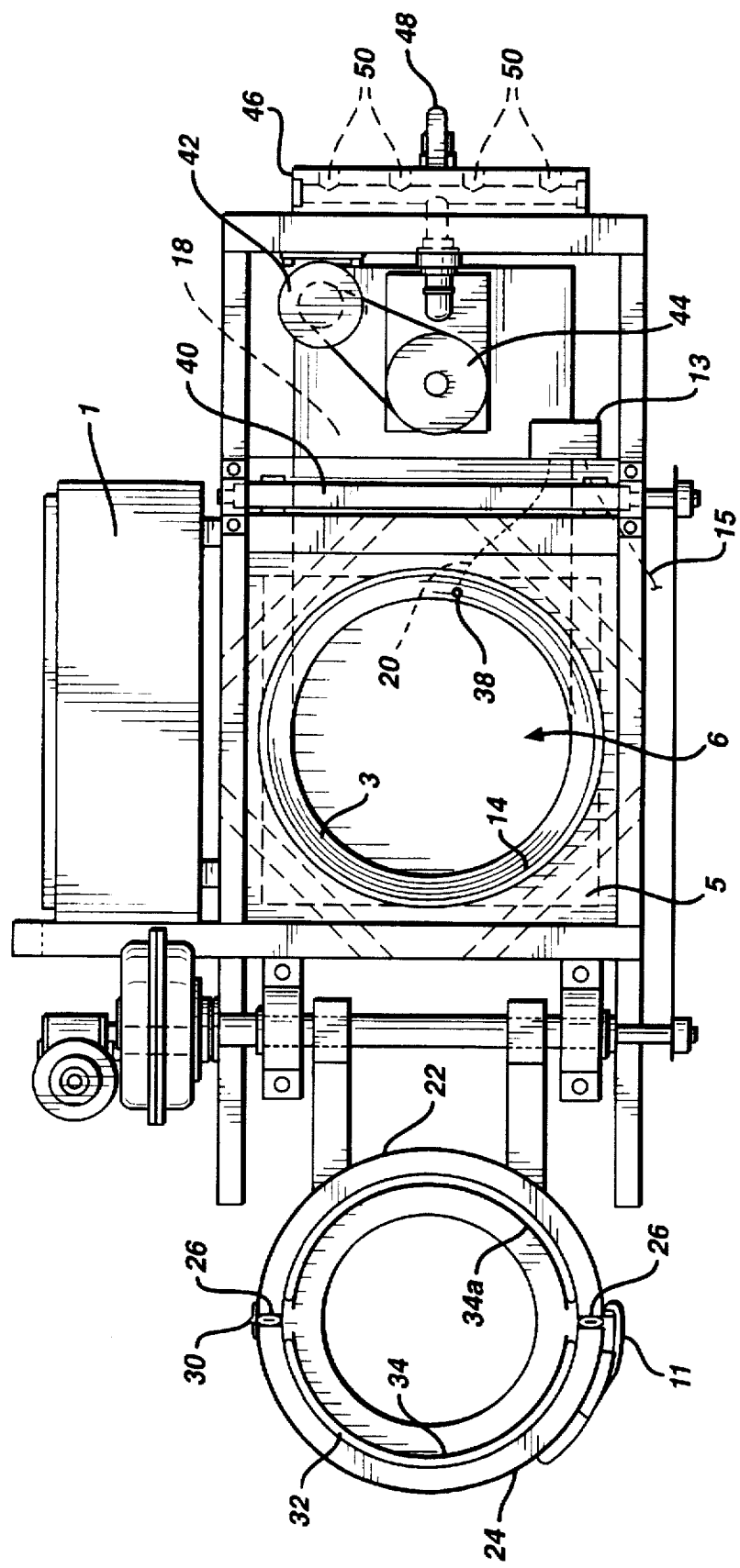
FIG. 2 is a top view of the invention.
Figure 10:
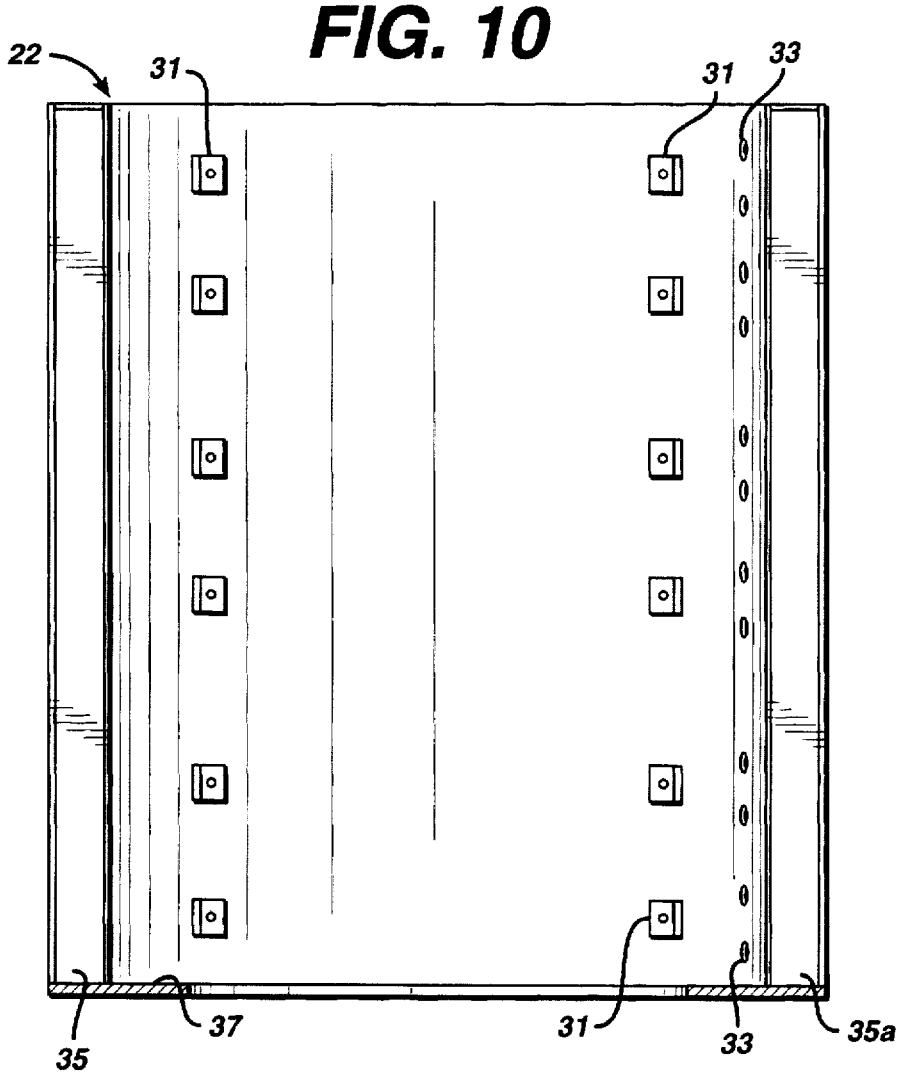
FIG. 10 is a front view of a portion of the device shown in FIG. 8.
Figure 11:
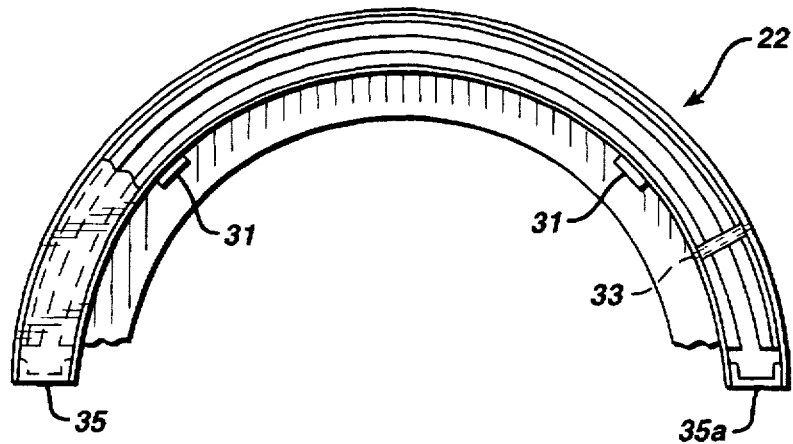
FIG. 11 is a top view of the device shown in FIG. 8.

In FIGS. 8–11, the drum container shown in FIGS. 1 and 2 has been removed. FIGS. 10–11 show one of the container supporting half sections with the aluminum sheet removed. Both halves of the container support, 22 and 24 are identical in internal structure. FIG. 10 is a front view of the half 22. FIG. 11 is a top view of the half shown in FIG. 10. As best shown in FIG. 11, each of the container supporting halves is hollow formed between inner and outer semi-cylindrical surfaces separated by end spacers and supports 35, 35a. As shown in both FIGS. 10 and 11, there are provided six sets of two each mounting and support connections 31. Each of the connections 31 is threaded to received a machine screw. The sheet segments 34 and 34a are mounted on to the connections 31 by threaded screws.

The electrical heating coils 32 are also affixed to the connections 31 by threaded screws and clamps when the sheets 34 and 34a are not used. The electrical heating coils 32 are supported by the sheets 34 and 34a when they are affixed to the connections 31.

Through holes 33 are provided to enable connection of the heaters 32 to a source of power, not shown.

Returning now to FIG. 1, the liquified melt from hopper 6 is collected in sump 18. The melt pump 36 is mounted in sump 18 so that it is bathed in the liquified melt. In this manner, the temperature of the pump 36 is always at the temperature of the liquified melt in sump 18. Thus, auxiliary heating/cooling for the pump is not required.

Figure 4:
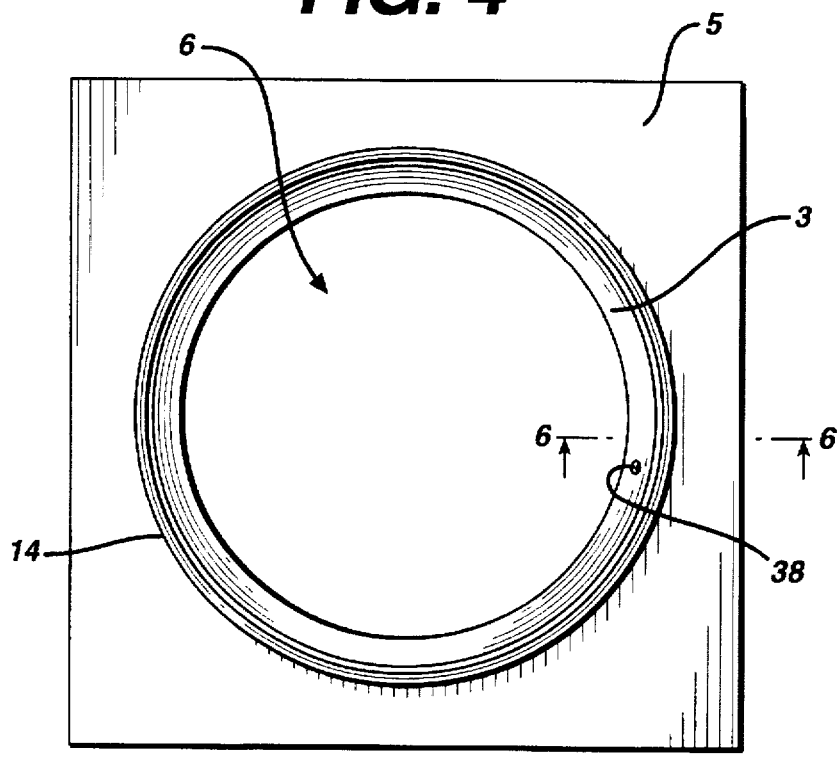
FIG. 4 is a top view of the seal portion of the invention.
Figure 5:
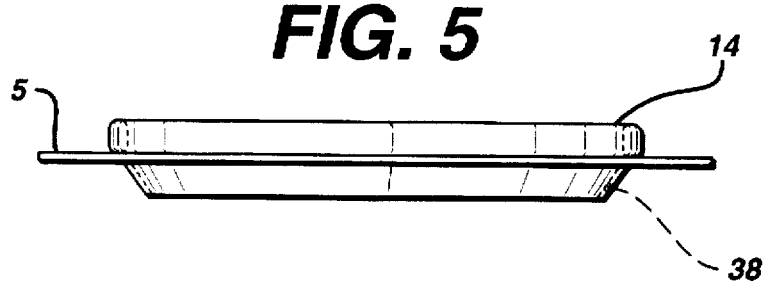
FIG. 5 is a side view of the seal shown in FIG. 4.

Also shown in FIG. 1 is an air valve, connector and pressure regulator shown generally at 13. This is the location where special gases from industrial gas containers (not shown) are coupled to the connector. The output of the gasses is fed to the top of the hopper for distribution in the hopper via the gas aperture 38 shown in FIGS. 4 and 5.

Another gas line 15 is connected from the connector at 13 to a probe 17 having a drum piercing portion 19. The probe 17 is mounted in one of the halves of the drum support cylinder so that, when both halves of the cylinder are closed and tightened, the probe will pierce the bottom of the drum 2. When the drum is inverted to the position 2', the controlled atmosphere is injected into the space between the bottom of the drum 2 and the slug in the drum. There may be a slight positive pressure thus generated in the bottom of the drum to aid in the removal of the contents of the drum.

Figure 12:
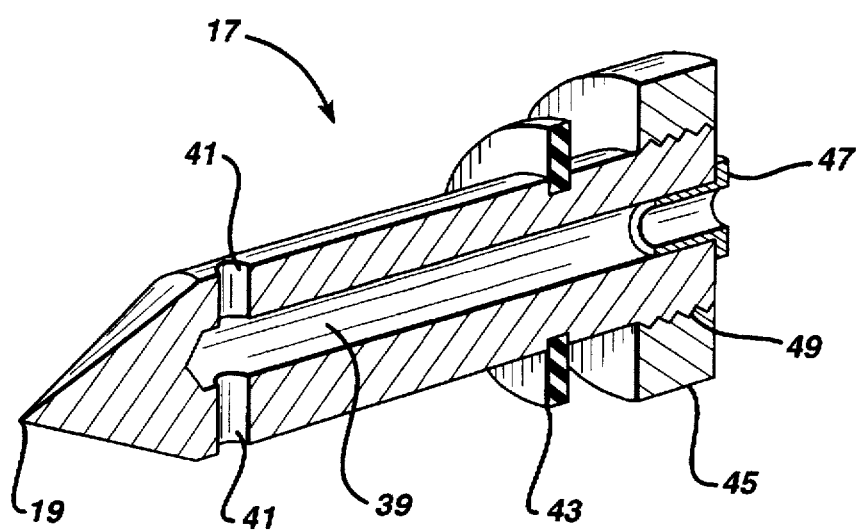
FIG. 12 is a perspective view of the probe shown in FIG. 1.
Figure 13:
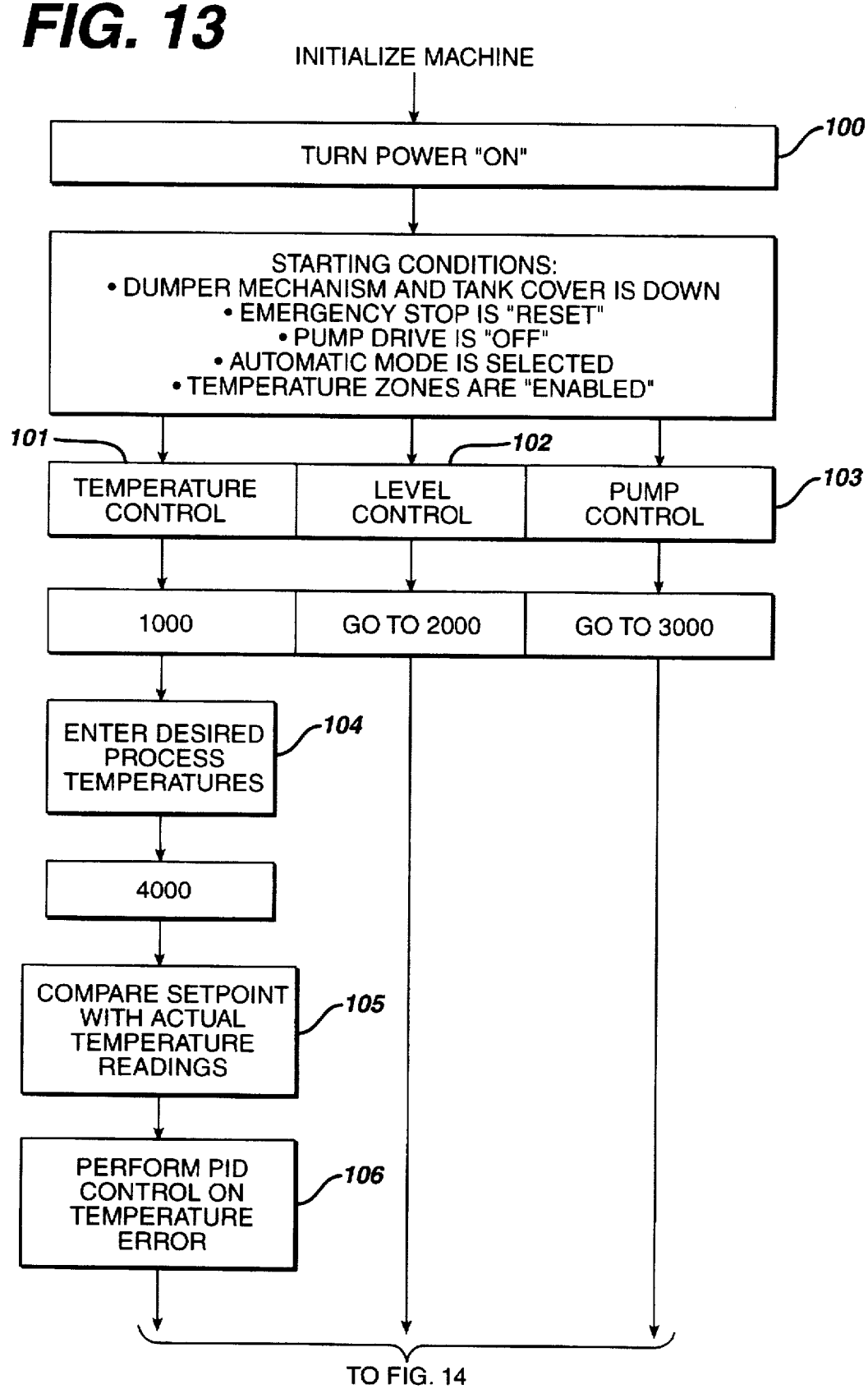
FIGS. 13–19, taken together is a flow chart of the control program for the apparatus of FIGS. 1–12.
Figure 14:
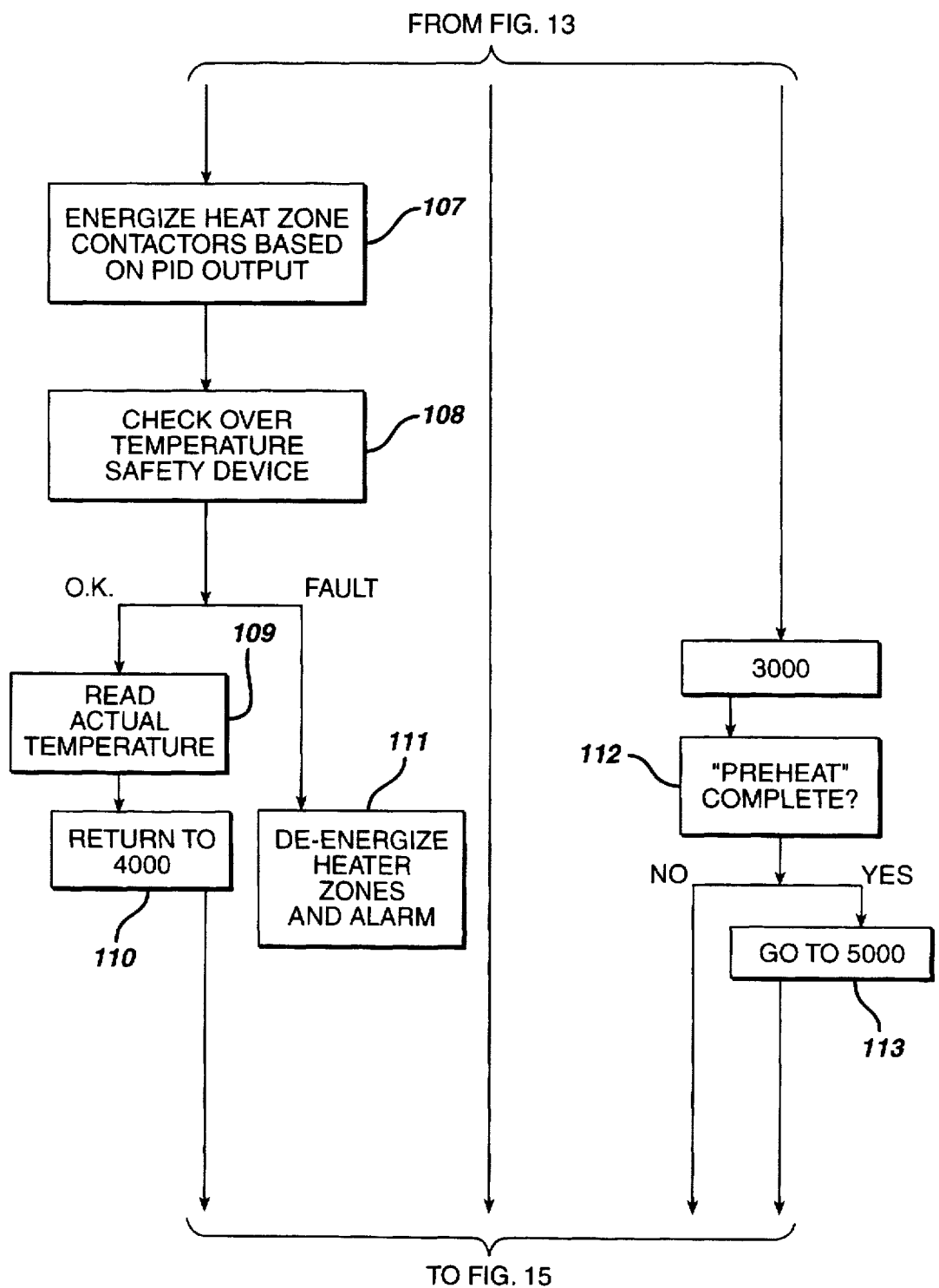
Figure 15:
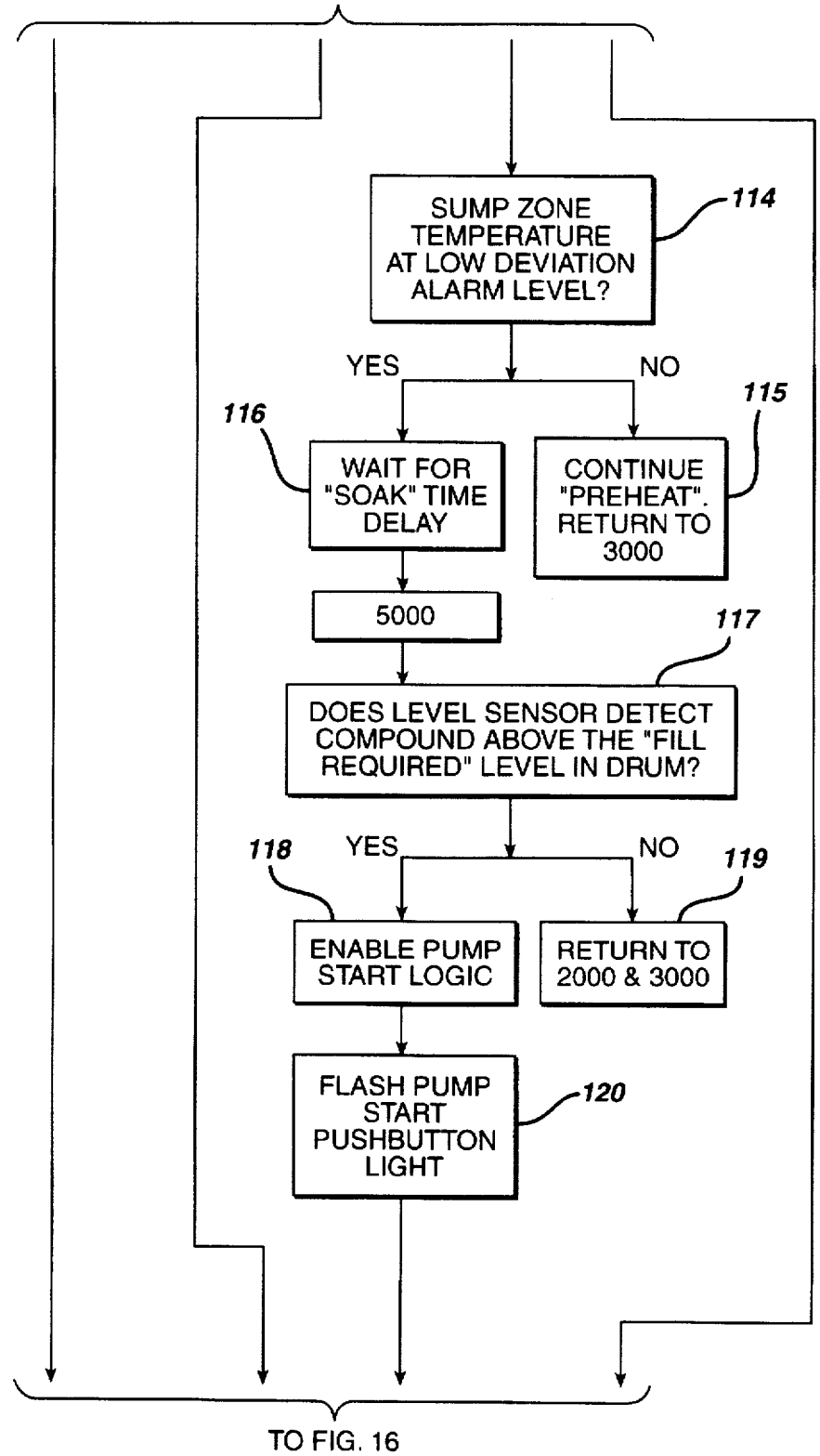
Figure 16:
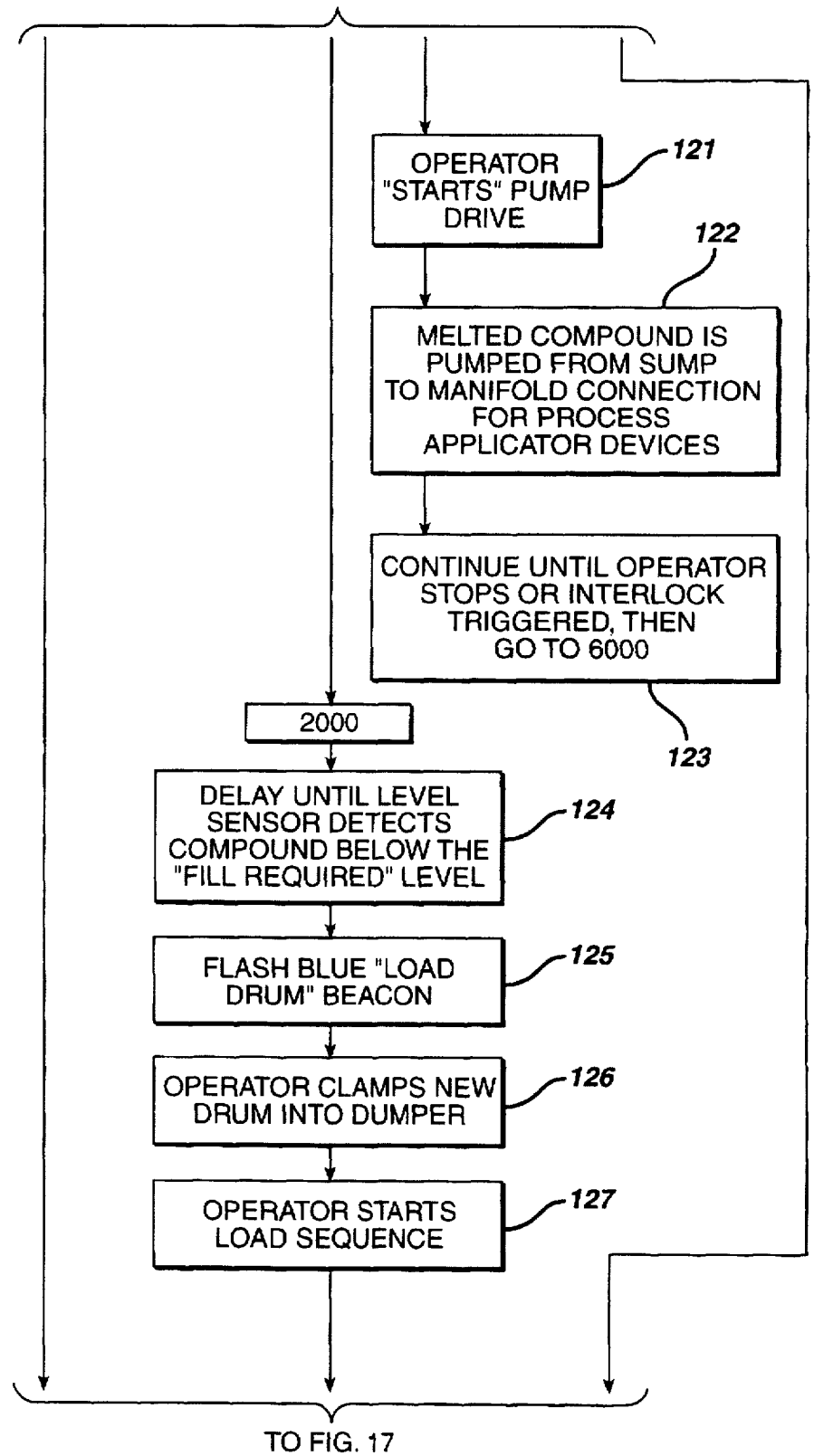
Figure 17:
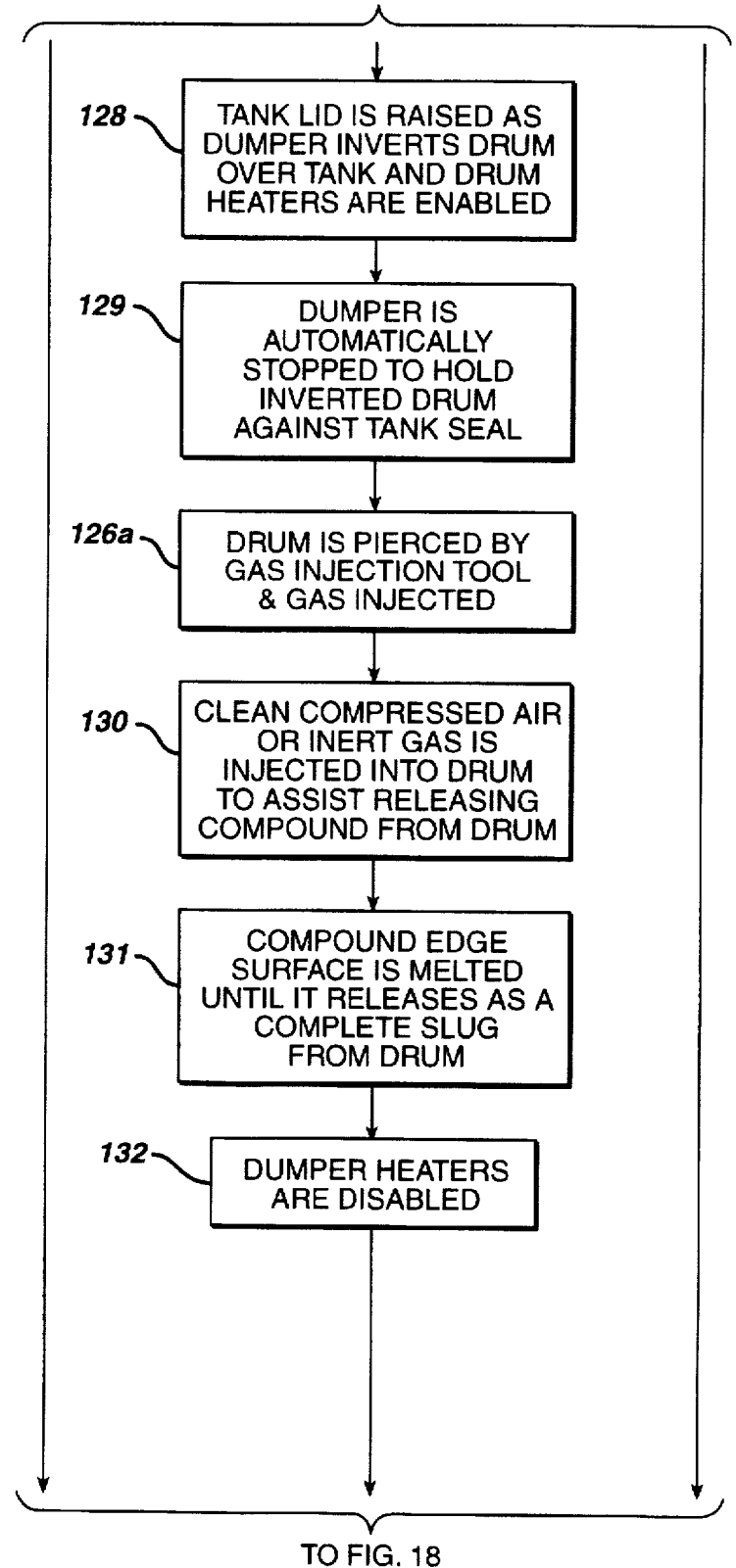
Figure 18:
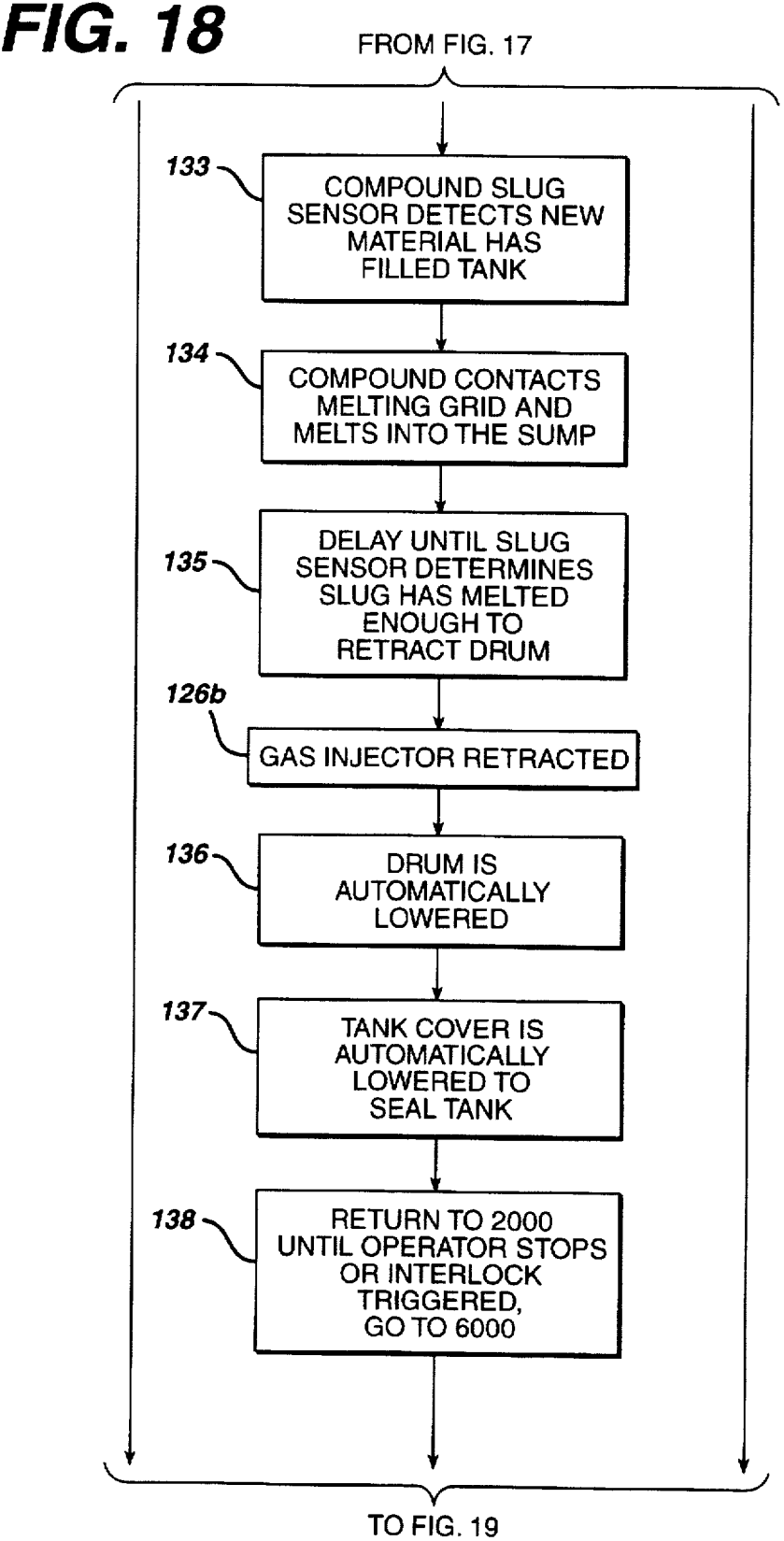
Figure 19:
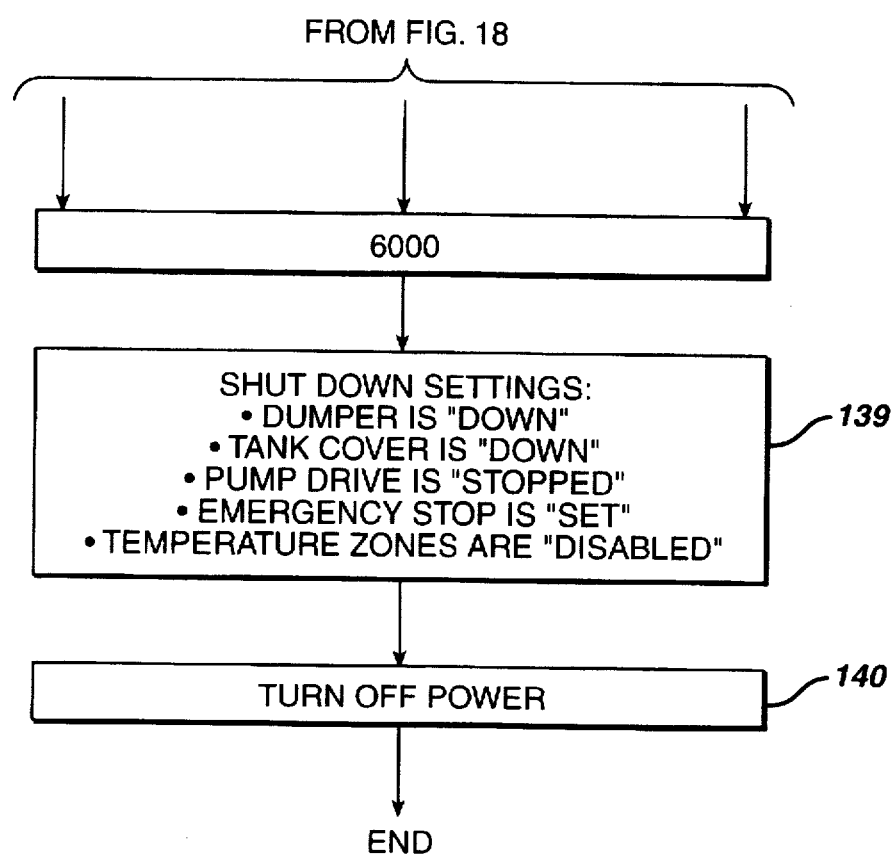

The probe is shown in greater detail in FIG. 12. The probe includes a body 17 which may be formed of a fluted metallic cylinder. The body is sharpened to a point 19. A through aperture 39 is drilled into body 17. The aperture 39 is connected to a fitting 47 for coupling the aperture to a gas line, not shown. The aperture 39 intersects another aperture 41 so that gas in aperture 39 may travel into and out of aperture 41. A seal 43 is securely mounted on the body 17. A thick metal strike plate 45 threadedly engages body 17 via screw threads shown generally at 49.

As will now be seen, the body 17 is manually or automatically forced into a container of hot melt so that the seal 43 is in contact with the walls of the container to seal the breach thus created in the container wall. Gas can now be supplied to the container via a path including the fitting 47, aperture 39 and aperture 41 where the gas is released into the container.

Figure 6:
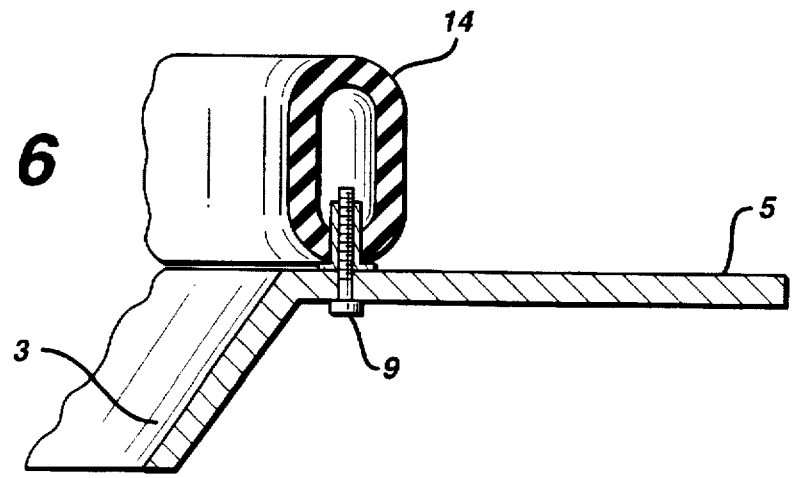
FIG. 6 is a sectional view taken along the line 6—6 of FIG. 4.

The ability to subject the material to a controlled atmosphere is enhanced by another hermetic seal 14, which is in addition to the hermetic seal formed around the periphery of the container by seals 26 and 26a. Hermetic seal 14 is formed between the drum carrier cylinder and the top of the hopper. This seal is shown in detail in FIGS. 1, and 3–6. The seal 14 may be formed of a hollow oval flexible rubber fastened to hopper opening plate 5 with MOLLY type fasteners 9 (FIG. 6). The seal 14 is laid out circumferentially about the opening to hopper 6. As is shown in detail in FIGS. 4–6, the hopper plate 5 has a circumferential lip portion 3 which directs the contents of the drum into the hopper and prevents spillage.

As will be seen in connection with FIG. 1, when the drum is in the position 2', the drum supporting cylinder halves 22, 24 compress seal 14 to the position shown in FIG. 1. There is thus formed an airtight seal between the hopper 6, drum 2 and the ambient atmosphere of the device. This seal, in combination with the seals 26 and 26a and the bottom plates 37 and 37a prevent gas leakage into and out of the hopper and the inverted container.

The hopper 6 is closed by a cover door 40 (shown open in FIG. 1) when the drum is in the position shown at 2 in FIG. 1.

FIG. 2 is a top view of the apparatus shown in FIG. 1 with a container shown in position 2 of FIG. 1. As shown in FIG. 2, the container 2 has clamp 11 for supporting same in the lifting mechanism. Heating element 32 is shown and described in connection with FIG. 7.

Figure 3:
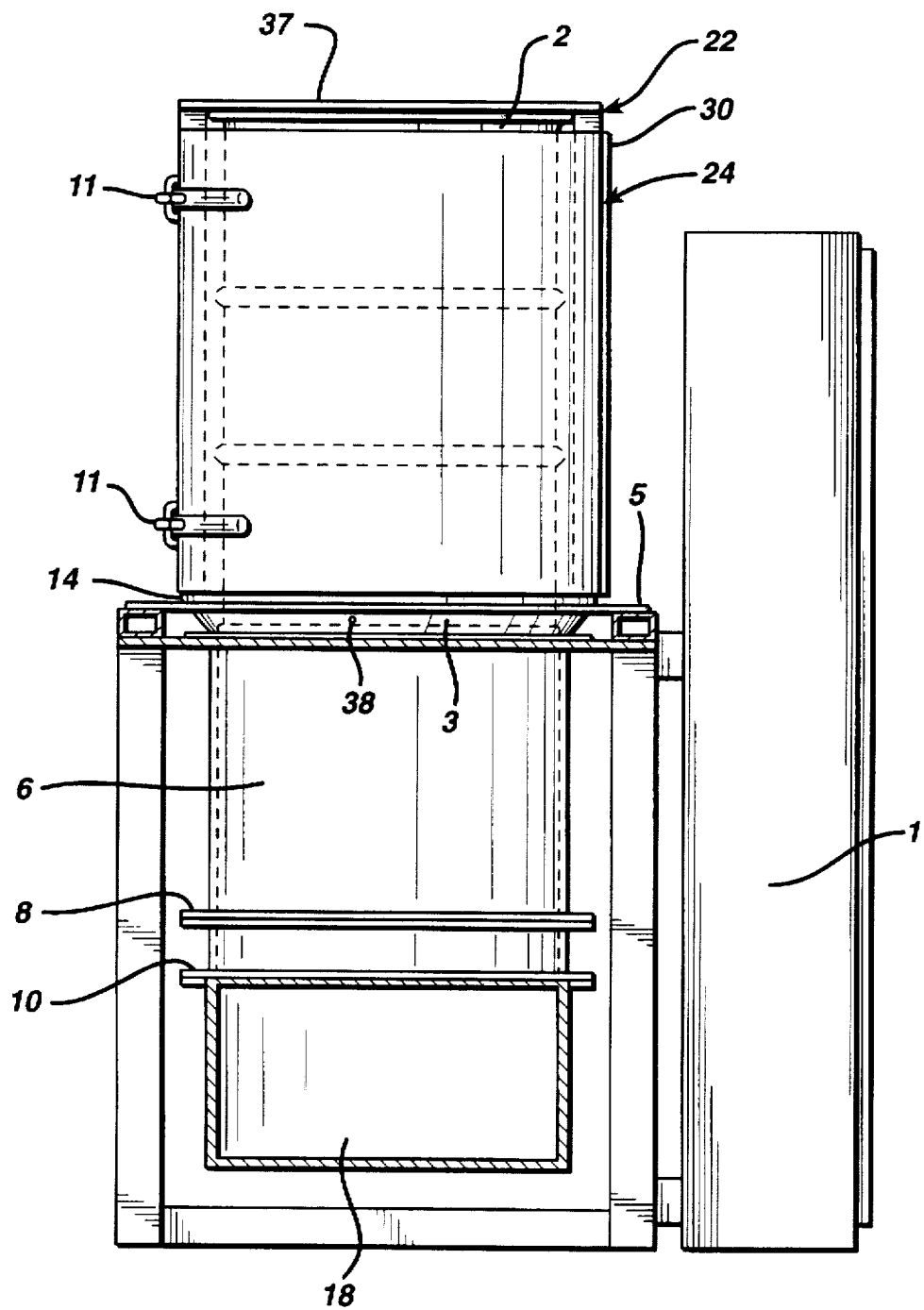
FIG. 3 is a sectional view taken along the line 3—3 of FIG. 1.

FIG. 3 is a section view taken along the line 3—3 of FIG. 1. The electrical control panel cabinet is shown at numeral 1 in FIG. 3.

FIGS. 1–2 also show the removable pump assembly 44 driven by a dc motor 42. The pump 36 is connected to a manifold 46 having four ports, 50 (FIG. 2). A drain 48 is provided for the sump 18.

In FIGS. 13–19, the flow chart commences in the block labeled 100 where the power is turned on at the starting conditions specified. Specifically, the starting conditions are that the dumper mechanism and tank cover is down, the emergency stop is reset, the pump drive is off, the automatic mode is selected, and the temperature zones are enabled.

At the initial conditions set forth in block 100, the flow chart has three (3) main paths, temperature control block 101, level control block 102, and pump control 103. The numerals 1000, 2000, 3000, 4000, 5000 and 6000 reference other subroutines in the flow chart and are provided so as to clearly explain the various operations in the control loops.

The first tasks that are performed is the entry of the process temperatures, block 104. In the loop labeled 4000, block 105, the desired temperatures are compared with actual temperature readings. Block 106 performs PID control on the temperature error. The heat zone contact is energized based on PID output, block 107. Block 108 checks over the temperature safety device. If "ok", actual temperature is read in block 109 and the loop returns to start 4000, block 110. If on the other hand the temperature safety device check over indicates a fault, then the control de-energizes the heater zones and sounds an alarm, block 107. When the preheat is complete, loop 3000, block 112, in the pump control, the control goes to reference 5000, block 113. If the preheat is not complete, block 114 indicates test of the sump zone temperature to check whether it is at the low deviation alarm level. If the test indicates that the sump zone temperature is not at the proper level, the control continues the preheat return to reference 3000, block 112 in block 115. If the sump zone temperature is at the proper level, the control block 116 waits for soak time delay. Block 117 after the soak time delay checks the level sensor to detect whether the compound is above the "fill required" level in the drum. If not, the loop returns to reference 2000, block 124, and 3000, block 112. The level sensor detects that the compound is above the fill required level, block 117, the pump is enabled, block 118, and a flash pump start push button light 120 is illuminated so that the operator, block 121 starts the pump drive. Melted compound is then pumped from the sump to manifold connection for process applicator devices, block 122, and is continued until either the operator stops the operation or an interlock is triggered, block 123. The level control loop 2000, block 124, initiates the delay until the level sensor detects the compound below the "fill required" level. Once the level sensor is at the required level, instruction to flash the blue "load drum" beacon is generated in block 125. The operator then clamps a new drum into the dumper, block 126. The operator then starts the load sequence, block 127. The tank lid is raised as the dumper inverts the drum over the tank and drum heaters are enabled, block 128. The dumper is automatically stopped to hold the inverted drum against the tank seal, block 129. The drum is pierced by the gas injection tool, block 126a. Clean compressed air or inert gas is injected in the drum to assist in releasing compound from the drum, block 130. Compound edge surface is melted until it releases as a complete slug from the drum, block 131. Then at block 132 the dumper heaters are disabled. Block 133 indicates that the compound slug sensors have detected new material which has filled the tank. The compound contacts the melting grid and melts into the sump, block 134. The delay at block 135 is provided until slug sensor determines that the slug has melted enough to retract the drum which, after the gas injector is retracted, bock 126b, is then automatically lowered in block 136. The tank cover is automatically lowered to seal the tank, block 137, and the systems returns to level control loop 2000 until the operator stops the machine or an interlock is triggered. The stop sequence, blocks 139 and 140, bears the flow reference numeral 6000. The shut down sequence settings are dumper is down, tank cover is down, pump drive is stopped, emergency stop is set, and the temperature zones are disabled. Then the power is turned off, block 140.

The above described flow charts were implemented on an Allen-Bradley Co. programmable controller model no. 1747 series software, APS release 5.01. The listings for the programmable controller program are set forth below.

```
Rung 2:0
BEGIN PROGRAM MD115G

ONE MINUTE CLOCK PULSE FACILITATES AN EXTENDED TIME BASE
| 1 MINUTE                                                              1 MINUTE
| PULSE                                                                 PULSE
|    T4:0                                                    +TON----------------+
|----]/[-----------------------------------------------------+TIMER ON DELAY  +-(EN)--
|     DN                                                     |Timer      T4:0+-(DN)
|                                                            |Time Base    0.01|
|                                                            |Preset       6000|
|                                                            |Accum           0|
|                                                            +-----------------+

Rung 2:1
DUMPER RAISED TO UPPER LIMIT
|    DUMPER UP                                                          DUMPER UP
|    #1 P/S#1
|      I:0                                                                 B3
|-+----] [-----+----------------------------------------------------------( )------
| |      6    |                                                             0
| | DUMPER UP |
| | #2 P/S#2  |
| |   I:0     |
| +----] [----+
|       7

Rung 2:2
RAISE DUMPER MANUALLY
| DUMPER     |DUMPER UP |DUMPER UP |PIERCING  |                         RAISE
| SYSTEM     |TOGGLE    |          |TOOL IN   |                         DUMPER
| AUTO SS-2  |SS-1      |          |OUT       |                         MANUALLY
|            |          |          |POSITION  |
|    I:0         I:0         B3         I:1                                B3
|----]/[---------] [---------]/[---------] [------------------------------( )------
|     4           2           0           3                                 1

Rung 2:3
LOWER DUMPER MANUALLY
| DUMPER     |DUMPER    |DUMPER IS |PIERCING  |                         LOWER
| SYSTEM     |DOWN      |DOWN      |TOOL IN   |                         DRUM
| AUTO SS-2  |TOGGLE    |P/S-3     |OUT       |                         MANUALLY
|            |SS-1      |          |POSITION  |
|    I:0         I:0         I:0        I:1                                B3
|----]/[---------] [---------]/[---------] [------------------------------( )------
|     4           3           8           3                                 2

Rung 2:4
BEGIN AUTOMATIC DUMPER CYCLE
| DUMPER     |START     |                                               DUMPER
| SYSTEM     |DUMPER    |                                               CYCLE
| AUTO SS-2  |CYCLE     |
|
|    I:0         I:1                                                       B3
|----] [---------] [---------------------23-------------------------------(L)------
|     4           5                                                         3
```

```
Rung 2:5
DUMPER UP DELAY PERIOD
  DUMPER UP  1 MINUTE                                       DUMPER UP
             PULSE                                          DELAY
                                                            PERIOD
      B3        T4:0                          +CTU----------------+
  ----] [-------] [---------------------------+COUNT UP         +-(CU)-
      0         DN                            |Counter     C5:0 +-(DN)
                                              |Preset        20|
                                              |Accum          0|
                                              +----------------+

Rung 2:6
RAISE DUMPER AUTOMATICALLY ON INITIATION OF CYCLE
  DUMPER    MELTING    DUMPER UP  PIERCING                   RAISE
  CYCLE     TIME DONE             TOOL IN                    DUMPER
                                  OUT                        AUTOMATIC
                                  POSITION
      B3        C5:0       B3        I:1                        B3
  ----] [------]/[--------]/[-------] [--------------------( )-----
      3         DN         0         3                          4

Rung 2:7
LOWERING CIRCUIT IS LATCHED AFTER BOTH THE MELTING PERIOD IS REACHED,
AND THE SLUG IS BELOW THE PHOTO-SENSOR
  DUMPER    MELTING    BARREL     DUMPER IS PIERCING         LOWER
  CYCLE     TIME DONE  CLEAN NO   DOWN      TOOL IN          DUMPER
                       SLUG       P/S-3     OUT              AUTOMATIC
                                            POSITION
      B3        C5:0       I:0       I:0       I:1              B3
  ----] [-----+-----] [--------] [-----+---]/[-------] [-------( )-----
      3       |   DN         9         |   8         3          5
              | LOWER                  |
              | DUMPER                 |
              | AUTOMATIC              |
              |    B3                  |
              +----] [-----------------+
                     5

Rung 2:8
THE UNINTERRUPTED CYCLE IS COMPLETED WHEN THE DUMPER REACHES THE LOWER LIMIT
SWITCH                                                      DUMPER
  MELTING    DUMPER IS                                      CYCLE
  TIME DONE  DOWN                                           FINISHED
             P/S-3                                             B3
      C5:0       I:0
  ----] [-------] [----------------------------------------( )----
      DN         8                                             6
```

Rung 2:9
COMPLETION OF THE CYCLE, OR A TRANSFER TO MANUAL CONTROL (AT ANY TIME),
RESETS BOTH THE ACCUMULATED TIME COUNTER, AND THE CYCLE ITSELF
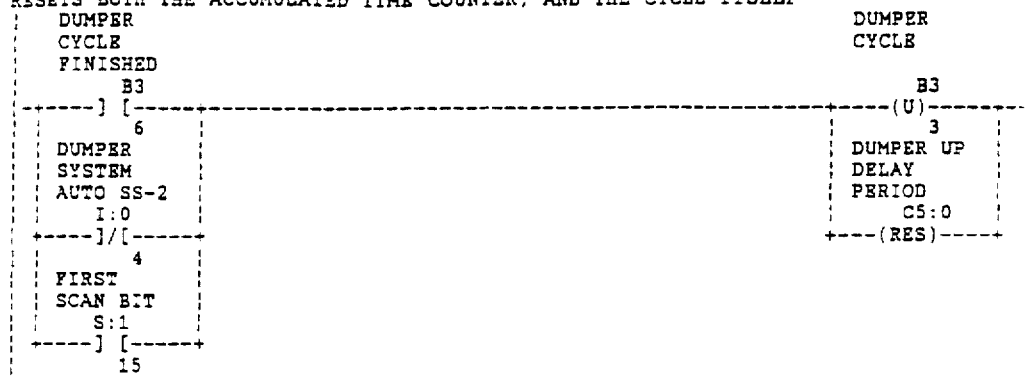
Rung 2:10
DELAY PERIOD ALLOWS HEAT TO SATURATE SUMP HEATING ZONE
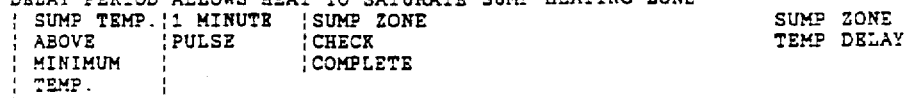
Rung 2:11
CHECK COMPLETE LATCHES UPON ITSELF TO PREVENT A COUNTER OVERFLOW
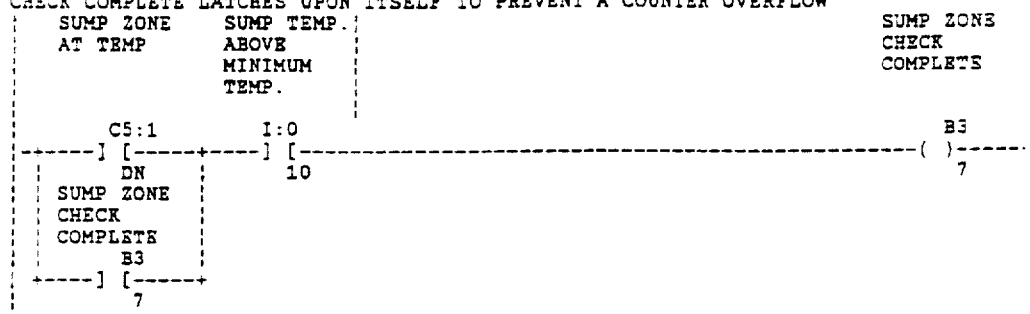
25

```
Rung 2:12
TIME PERIOD COUNTER IS RESET BY CHECK COMPLETE CIRCUIT
      SUMP ZONE                                                      SUMP ZONE
      CHECK                                                          TEMP DELAY
      COMPLETE
         B3                                                               C5:1
|-+----] [-----+-------------------------------------------------------(RES)----
  |            |
  |  FIRST     |
  |  SCAN BIT  |
  |    S:1     |
  +----] [-----+
        15

Rung 2:13
LOW LEVEL AUDIBLE ALARM ACKNOWLEDGE
  LOW         ALARM ACK                                              ALARM
  LEVEL       PUSHBUTTON                                             ACK
  BEACON                                                             LATCH
    O:1           I:0                                                  B3
|----] [-----+----] [-----+---------------------------------------------( )-----
      0      |      5     |                                            8
             |  ALARM     |
             |  ACK       |
             |  LATCH     |
             |   B3       |
             +----] [-----+
                   8

Rung 2:14
ENABLE PUMP DRIVE
INITIAL START REQUEST REQUIRES A NEW SLUG TO BE PRESENT
CIRCUIT IS BLOCKED UNTIL SUMP ZONE CHECK IS COMPLETED
CIRCUIT IS DISABLED ON HIGH PRESSURE INPUT
  START       |BARREL       STOP       |SUMP ZONE |HIGH          |   START
  DC DRIVE    |CLEAN NO     DC DRIVE   |CHECK     |PRESSURE      |   DC DRIVE
              |SLUG                    |COMPLETE  |INPUT         |   CR1
    I:0          I:0          I:0         B3         I:1             O:0
|-+----] [----+----] [-----+----] [------] [--------]/[----------------( )-----
  |      0          9      |      1            7         1             0
  |  START                 |
  |  DC DRIVE              |
  |  CR1                   |
  |   O:0                  |
  +----] [-----------------+
         0

Rung 2:15
DUMPER HEATER CONTACTOR IS ENABLED IN THE RAISED POSITION
IN AUTOMATIC MODE, HEATER IS DISABLED AFTER THE SPECIFIED TIME PERIOD
  DUMPER UP    MELTING                                                DUMPER
               TIME DONE                                              HEAT
                                                                      ENABLE
       B3         C5:0                                                  O:0
|----] [-----+----]/[-----+---------------------------------------------( )-----
      0      |    DN      |       26                                    1
             |            |
            +++          +++
```

```
                    +++              +++
                    |                |
                    | DUMPER         |
                    | CYCLE          |
                    |    B3          |
                    +----]/[---------+
                          3

Rung 2:16
SLUG PRESUMED TO BE MELTED
  | MELTING   |BARREL   |                                                        OK TO
  | TIME DONE |CLEAN NO |                                                        LOWER THE
  |           |SLUG     |                                                        DRUM
  |           |         |                                                        BEACON
  |           |         |                                                        LT-15
  |    C5:0        I:0                                                             O:0
  |----] [--------] [-------------------------------------------------------------( )------
          DN         9                                                             2

Rung 2:17
LOW LEVEL AUDIBLE ALARM
  | LOW     |ALARM  |                                                            ALARM
  | LEVEL   |ACK    |                                                            HORN
  | BEACON  |LATCH  |
  |   O:1       B3                                                                 O:0
  |----] [--------]/[-------------------------------------------------------------( )------
         0         8                                                               3

Rung 2:18
RAISE DUMPER MOTOR CONTACTOR
  | RAISE      DUMPER    |DUMPER  |                                            DUMPER UP
  | DUMPER     ACCESS    |DOWN    |                                            MC1F
  | MANUALLY   GATE      |MC1R    |
  |    B3        I:1        O:0                                                   O:0
  |-+----] [-----+----] [--------]/[---------------------------------------------( )------
   |     1            2          6                                                5
   | RAISE      |
   | DUMPER     |
   | AUTOMATIC  |
   |    B3      |
   +----] [-----+
         4

Rung 2:19
LOWER DUMPER MOTOR CONTACTOR
  | LOWER      DUMPER    |DUMPER UP |                                          DUMPER
  | DRUM       ACCESS    |MC1F      |                                          DOWN
  | MANUALLY   GATE      |          |                                          MC1R
  |    B3        I:1        O:0                                                   O:0
  |-+----] [-----+----] [--------]/[---------------------------------------------( )------
   |     2            2          5                                                6
   | LOWER      |
   | DUMPER     |
   | AUTOMATIC  |
   |    B3      |
   +----] [-----+
         5
```

```
Rung 2:20
PUMP DRIVE RUN LAMP (ILLUMINATED PUSHBUTTON)
|    SUMP ZONE  |640 mSEC |                                              PUMP
|    CHECK      |         |                                              DRIVE
|    COMPLETE   |         |                                              RUN LAMP
|       B3          S:4                                                    O:0
|-+----] [--------] [-----+------------------------------------------------( )------
| |     7           5     |                                                 7
| | START                 |
| | DC DRIVE              |
| | CR1                   |
| |    O:0                |
| +----] [----------------+
|      0

Rung 2:21
LOW LEVEL ALARM BEACON
| DUMPER IS |LOW LEVEL |                                                 LOW
| DOWN      |INPUT     |                                                 LEVEL
| P/S-3     |          |                                                 BEACON
|    I:0         I:1                                                       O:1
|----] [--------] [-------------------------------------------------------( )------
|     8          0                                                         0

Rung 2:22
DRUM IS PUNCTURED AND COMPRESSED GAS FORCES THE SLUG OUTWARDS
| DUMPER UP |MELTING   |                                                 PIERCING
|           |TIME DONE |                                                 TOOL AND
|           |          |                                                 GAS
|           |          |                                                 INJECTOR
|     B3         C5:0                                                      O:1
|----] [--------]/[-------------------------------------------------------( )------
|     0          DN                                                        1

Rung 2:23
DUMPER CYCLE LAMP (ILLUMINATED PUSHBUTTON)
|    DUMPER                                                               DUMPER
|    CYCLE                                                                CYCLE
|                                                                         LAMP
|       B3                                                                 O:1
|-+----] [----------------+------------------------------------------------( )------
| |     3                 |                                                 2
| | DUMPER IS |640 mSEC   |
| | DOWN      |           |
| | P/S-3     |           |
| |    I:0         S:4    |
| +----] [--------] [-----+
|       8          5

Rung 2:24
|
|-----------------------------------+END+-----------------------------------------
|
```

28

Modifications of the foregoing may be made without departing from the spirit and scope of the invention. What is desired to be protected by Letters Patents is set forth in the appended claims.

What is claimed is:

1. The method for unloading a slug of solid, unitary mass hot melt from a container into a hot melt dispenser hopper, said slug being retained inside said container by adhesion of said slug to the inside surfaces of said container in its unheated condition, comprising the steps of:

placing a container in a heated support and carrier;
   inverting and heating said container to release the contents of said container into a hopper;
   sealing the inverted container and the hopper from ambient atmospheric conditions; and
   injecting a controlled atmosphere into said hopper for treating the contents of said container.

2. The method of claim 1 further including the step of injecting a controlled atmosphere near the bottom of an inverted container.

3. The method of claim 1 further including the step of heating a fibre container in said support and carrier with a smooth, non-abrasive, non-obtrusive heat conducting surface.

4. The method of claim 1 further including the step of heating a metallic container in said support and carrier by direct contact between said container and heaters in said support and carrier.

5. The method of claim 1 further including the steps of providing a sump connected to said hopper for collecting the output of hot melt material from said hopper, and immersing a pump for said hot melt material in said sump and bathing said pump with said hot melt material.

6. A hot melt dispenser for dispensing a solid unitary mass slug of hot melt from a container wherein said slug adheres to the inside surfaces of said container in its unheated condition, said container being open at one end to permit said slug to slide freely out of said container when said slug is released therefrom by the lowering of adhesion of the sides of said slug to said container, said dispenser comprising:

container support and inverting means including:
   first and second openable enclosures for said container;
   support means for supporting said container connected to an end of one of said enclosures;
   means connected to at least one of said enclosures for moving said enclosure from a first position to a second position;
   means for opening said enclosures in said first position to allow a container to be placed between said open enclosures;
   means for closing said enclosures about a container and supporting the container in said first and second closed enclosures; and
   container heating means connected to each of said first and second enclosures.

7. A hot melt dispensing machine comprising:
   a hopper for receiving a slug of hot melt material;
   container lifting and inverting means operatively associated with said hopper for lifting a container of hot melt material and dispensing a slug of hot melt material into said hopper;
   heating means inside said hopper to heat and liquify a slug of hot melt material dispensed into said hopper;
   a sump for collecting hot melt material which has been heated by said heating means in said hopper;
   a pump disposed in said sump to pump said hot melt material in its molten state out of said sump;
   a power source connected to the pump for powering the pump;
   control means for said power source for powering said pump only when said hot melt material in said sump is in a liquid state and at a sufficient level;
   said pump intended to be submerged in said hot melt material;
   said pump intended to be heated by said hot melt material to maintain the temperature of the pump during pumping operations;
   means to introduce a controlled atmosphere into said hopper; and
   means to hermetically seal the hopper during operations to enable control of the atmosphere within the hopper.

8. The machine of claim 7 wherein said hermetic seal is connected to the mouth of said hopper.

9. The machine in claim 8 wherein said seal co acts with a closure for said hopper.

10. A hot melt dispensing machine comprising:
    a hopper for receiving a slug of hot melt material;
    container lifting and inverting means for lifting a container of hot melt material and dispensing a slug of hot melt material into said hopper;
    heating means inside said hopper to heat and liquify a slug of hot melt material dispensed into said hopper;
    a sump for collecting hot melt material which has been heated by said heating means in said hopper;
    a pump disposed in said sump to pump said hot melt material in its molten state out of said sump;
    a power source connected to the pump for powering the pump;
    said pump intended to be submerged in said hot melt material;
    said pump intended to be heated by said hot melt material to maintain the temperature of the pump during pumping operations;
    means to introduce a controlled atmosphere into said hopper; and
    means to hermetically seal the hopper during operations to enable control of the atmosphere within the hopper;
    said hermetic seal means connected to the mouth of said hopper;
    wherein said seal coacts with a closure for said hopper;
    said hermetic seal means connected between said hopper and said container lifting and inverting means when said container is in its inverted position.

11. A method for unloading a slug of solid, unitary mass hot melt from a container into a hot melt dispenser hopper, said slug being retained inside said container by adhesion of said slug to the inside surfaces of said container in its unheated condition, comprising the steps of:

placing a container in a heated support and carrier;
    closing said heated support and carrier about the container;
    causing the container to invert and to dump its contents into a hopper;
    heating the container in the support and carrier to assist in dumping the contents into a hopper;
    melting the contents of the container in the hopper and collecting the melted contents in a sump;
    immersing a pump in the sump to control the temperature of the pump;

pumping the contents of the sump out of the sump for further processing;

sealing the inverted container and the hopper from ambient atmospheric conditions;

injecting a controlled atmosphere into said hopper for treating the contents of said container; and injecting a controlled atmosphere near the bottom of an inverted container.

12. The method of claim 11 further including the step of heating a fibre container in said support and carrier with a smooth, non-abrasive, non-obtrusive heat conducting surface.

13. The method of claim 11 further including the step of heating a metallic container in said support and carrier by direct contact between said container and heaters in said support and carrier.

14. A hot melt dispenser for dispensing a solid unitary mass slug of hot melt from a container wherein said slug adheres to the inside surfaces of said container in its unheated condition, said container being open at one end to permit said slug to slide freely out of said container when said slug is released therefrom by the lowering of adhesion to the sides of said slug to said container, said dispenser comprising:

container support and inverting means including:

first and second openable cylindrical enclosures for said container; each of said cylindrical enclosures including heating means connected to said enclosures; a removable heat conductive sheet connected to each of said cylindrical enclosures adjacent said heating means for heating fibre containers in said cylindrical enclosures; hinge means connected to each of said cylindrical enclosures for permitting said enclosure to open and close about said container; and means connected to at least one of said cylindrical enclosures for moving said enclosures from a first position to a second position, said container being inverted in said second position.

15. A hot melt dispensing machine comprising:

hopper means for receiving and melting a slug of hot melt material;

heating means in said hopper for heating said material;

container lifting and inverting means operatively associated with said hopper for lifting a container of hot melt material and dispensing a slug of hot melt material into said hopper means; and pump means bathed by said melting hot melt material for pumping said hot melt material for further processing, the temperature at said pump means being controlled by the temperature of said melting hot melt material;

means to introduce a controlled atmosphere into said hopper means;

means to hermetically seal said hopper means to enable control of the said atmosphere within the hopper;

said hermetic seal means connected between said hopper means and said container lifting and inverting means when said container is in its inverted position.

* * * * *